L. H. THULLEN.
COMMUTATOR SHORT CIRCUITING DEVICE.
APPLICATION FILED APR. 1, 1910.

1,007,902.

Patented Nov. 7, 1911.
2 SHEETS—SHEET 1.

WITNESSES:
Peter A. Roe
Geo. N. Kerr

INVENTOR
Louis H. Thullen
BY
Edwards, Sager & Wooster
his ATTORNEYS

L. H. THULLEN.
MUTATOR SHORT CIRCUITING DEVICE.
APPLICATION FILED APR. 1, 1910.

1,007,902.

Patented Nov. 7, 1911.

2 SHEETS—SHEET 2.

Witnesses:
Peter A. Roe
Geo. N. Kerr

Louis H. Thullen, Inventor
By his Attorneys
Edwards, Sager & Wooster

UNITED STATES PATENT OFFICE.

LOUIS HENRY THULLEN, OF CINCINNATI, OHIO, ASSIGNOR TO THE TRIUMPH ELECTRIC COMPANY, A CORPORATION OF OHIO.

COMMUTATOR-SHORT-CIRCUITING DEVICE.

1,007,902.   Specification of Letters Patent.   Patented Nov. 7, 1911.

Application filed April 1, 1910. Serial No. 552,805.

*To all whom it may concern:*

Be it known that I, LOUIS H. THULLEN, a citizen of the United States, residing at Cincinnati, in the county of Hamilton and State of Ohio, have invented certain new and useful Improvements in Commutator-Short-Circuiting Devices, of which the following is a full, clear, and exact specification.

This invention relates to means for electrically connecting together segments of a commutator.

The present invention, while applicable to numerous uses, is particularly well adapted for use in connection with the operation of single phase alternating current motors.

As is well known to persons skilled in the art, motors operated by single phase alternating currents will not start from rest when connected to operate as induction or synchronous motors. For this reason single phase alternating current motors are frequently supplied with commutators, whereby the motor can be made to operate as a commutator type motor in starting, while when the motor has been brought up to approximate speed the conductors connected with the commutator have their circuits locally closed, or short-circuited, by connecting together segments of the commutator, or otherwise, so that the motor may operate as an induction motor.

Various devices have been provided which are adapted to locally close, or short-circuit, the windings connected to the commutator when a certain speed has been reached, and it is the general object of the present invention to provide improved apparatus of the character described.

Among the specific objects of the invention may be mentioned the protection of the connecting or short-circuiting means from liability to derangement or breakage by reason of coming into contact with foreign bodies, and also to preserve the connecting means from the deleterious influences of oil, dust, dirt or dampness, which might interfere with its proper operation.

Other objects of the invention will appear hereinafter.

The invention can be best described in connection with the accompanying drawings, which illustrate the invention, and of which—

Figure 1:
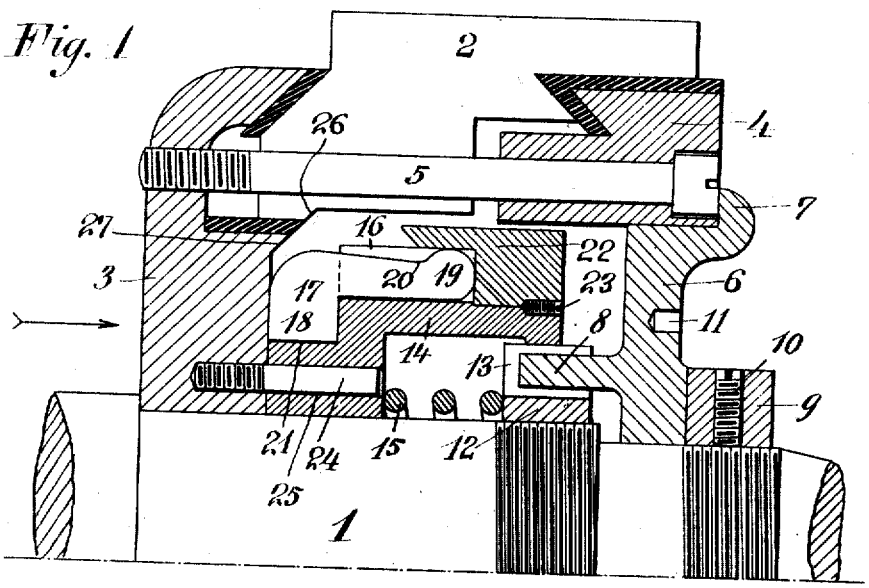
Figure 2:
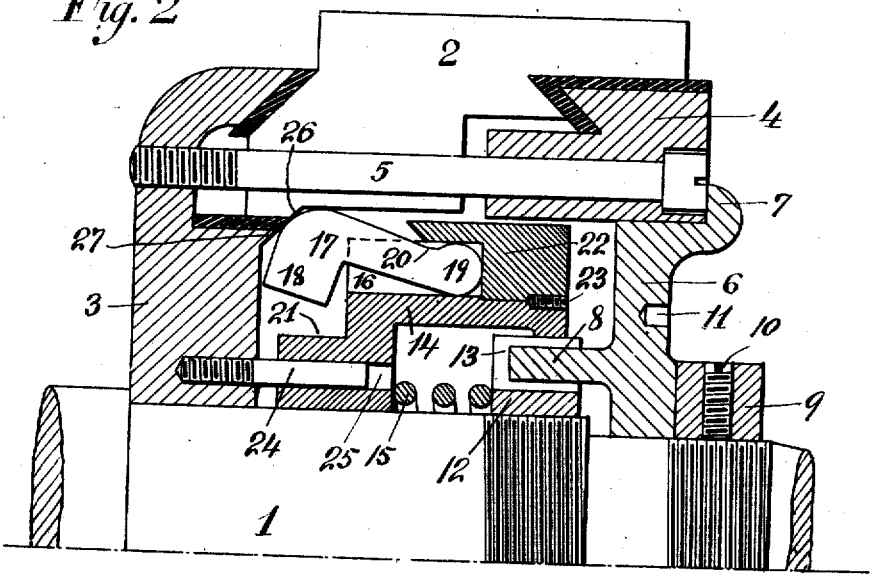
Figure 6:
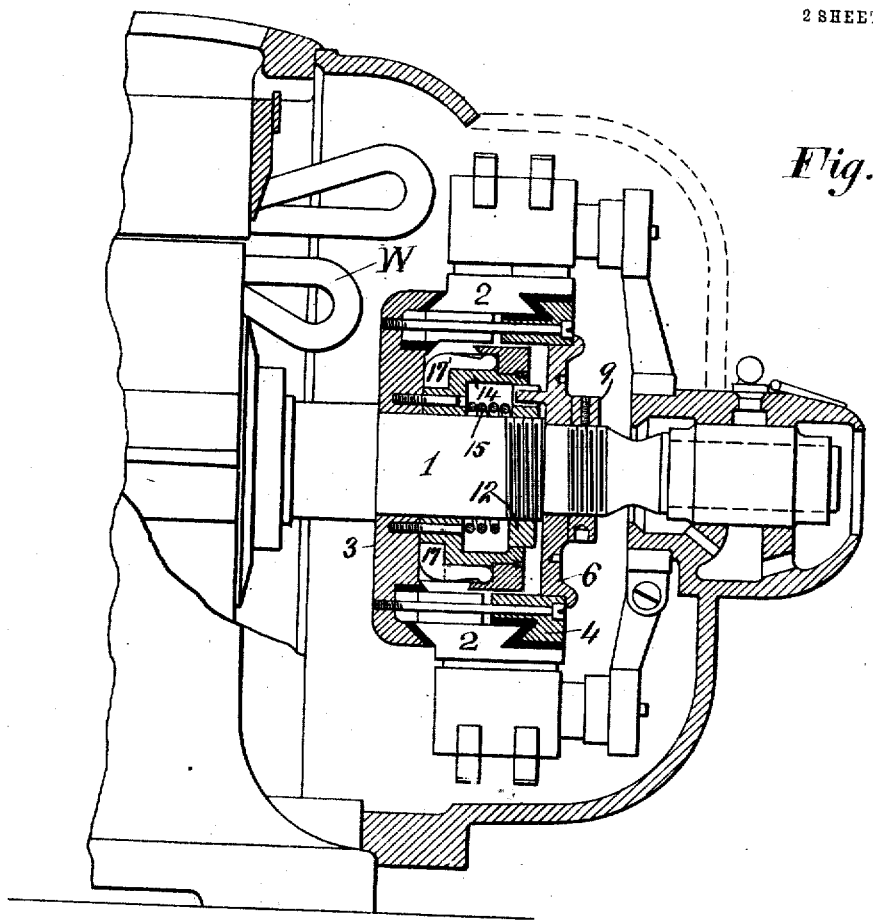
Figure 3:
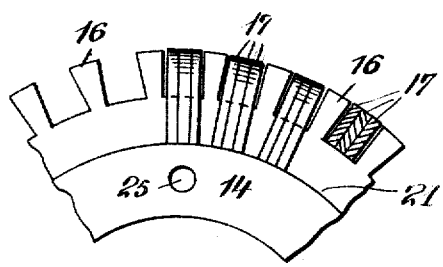
Figures 4, 5:
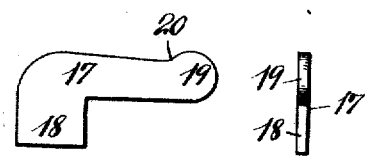

Figure 1 is a view showing in longitudinal section a commutator and the improved connecting means mounted upon an armature or rotor shaft. Inasmuch as the parts are symmetrical about the shaft, but one-half of the commutator structure and connecting means is shown. In this figure the connecting means is shown in position such that the segments of the commutator are not connected. Fig. 2 is a view like Fig. 1, except that the connecting means is shown in position such that the segments of the commutator are electrically connected. Fig. 3 is an elevation looking in the direction of the arrow in Fig. 1, of a segment of the tumbler carriage, some of the tumblers being shown in position, and of those shown some are in end view and others in section, it being understood that the carriage is circular and symmetrical about the shaft. Fig. 4 is a side view of a tumbler. Fig. 5 is an end view thereof, and Fig. 6 is a longitudinal section through a motor to which the present invention is applied, but a fragment of the motor is shown, only sufficient to show the application of the invention thereto, the remainder of the motor being broken away.

Referring to the drawings, upon the armature or rotor shaft 1 is mounted a commutator which comprises conducting contacts or segments and supporting and clamping means therefor. These segments, as 2, are arranged side by side in a well known manner so as to form a cylinder about the shaft 1. These segments are insulated from each other and also from clamping rings 3 and 4, which are drawn together by bolts or screws, as 5, so as to clamp the segments together in a well known manner.

It will be understood that upon the shaft 1 is mounted a suitable armature winding which may be connected with the commutator segments 2 in any of the ways well known in the art. An end of this winding is indicated in Fig. 6 at W.

The ring 3 is of greater radial width than the ring 4. It will be noted that a space is formed between the commutator segments and the shaft; the clamping ring 3 fitting upon the shaft, supporting the commutator structure and closing one end of this chamber. The ring 3 is secured against turning upon the shaft by any suitable means. At the other end of the chamber is an annular plate 6 fitting upon the shaft and revoluble thereon. This annular plate 6 makes a sliding fit at its periphery with the interior of the clamping ring 4 and is provided with an annular lip 7, which overlaps the inner edge of the ring 4. Also, the plate 6 has one or more projections, as 8, from its inner face for a purpose as will hereinafter appear. To lock the annular plate 6 in position a collar 9 is threaded upon the shaft 1 and may be fixed in any position of adjustment by any suitable means, as a set screw 10. The plate 6 having been adjusted as desired, it may be locked in position by screwing the collar 9 against it, when it will be forced against the clamping ring 4, and the plate 6 will thus be securely bound in position between the ring 4 and the collar 9. To facilitate the turning of the plate 6, it may be provided with any suitable configuration to coöperate with a tool, and in the present instance is shown as provided with one or more sockets or recesses 11, within which the prongs of a turning tool may be inserted.

In the chamber within the commutator, as described, is mounted means for alternately connecting and disconnecting the commutator segments. This means will now be described. Threaded upon the shaft is a collar 12, which is provided with recesses, as 13, for the reception of the projections 8. The collar 12 is thus held in a substantially fixed relation to the plate 6, turning therewith and being fixed in position thereby. Bearing upon the shaf 1 and upon the collar 12 is a tumbler ca..iage 14, and a spring 15 is interposed between this carriage and the collar 12. The periphery of the tumbler carriage is divided into compartments by means of radially projecting walls 16, and within each of these compartments is laid one or more of the tumblers 17. These tumblers are L-shaped, one of the legs 18 being heavier than the other, while the other leg 19 has one end rounded, as shown, so as to turn easily about that end, and is provided with a depression 20 upon its outer side. A groove 21 extending circumferentially about the carriage 14 accommodates the legs 18 of the tumblers. A cap 22 overlaps the rounded end of the legs 19 so as to prevent the same from flying outwardly, and this cap is secured to the tumbler carriage by any suitable means, such, for example, as screws 23, which take partly into the carriage 14 and partly into the cap 22. Preferably, the carriage 14 and the cap 22 are made of cast brass, and the tumblers are formed from sheet copper.

From the inner face of the ring 3 extend one or more projections, as 24, which extend within holes 25 in the tumbler carriage so that radial movement of the carriage with relation to the clamping ring 3 cannot take place, but longitudinal movement along the shaft is permitted.

The inner edges of the commutator segments are provided with inclined surfaces, as 26, which are substantially continuations of a similar inclined surface 27 upon the ring 3, and with this inclined surface 27 and the surfaces 26 the tumblers are adapted to engage in the operation of the apparatus, as will now be set forth.

When the shaft is at rest or running at a low speed, the spring 15 presses the tumbler carriage to the left and the parts will be in the position as shown in Fig. 1. When a certain speed has been reached, the legs 18 of the tumblers will fly outwardly under the action of centrifugal force, the tumblers turning about the rounded ends of the legs 19. The tumblers will first come against the inclined surface 27, and as the centrifugal force increases with the speed, there will be produced a wedging action which will produce a thrust upon the tumbler carrying means. This thrust acting against the spring 15 will cause the tumbler carriage to be moved to the right, and as this action continues the ends of the tumblers will travel along the incline formed by the surfaces 27 and 26 (thereby forming a wiping contact), until they reach the position as shown in Fig. 2, when they will be in contact with the commutator segments and these segments will be electrically connected together or short-circuited through the tumblers and the tumbler carrying means. As the speed, and therefore the centrifugal force, decreases, the spring 15 will force the tumbler carriage to the left and the tumblers traveling in the opposite direction along the inclined surfaces 26 and 27 will pass out of contact with the commutator segments and assume the positions as shown in Fig. 1.

Inasmuch as the tumblers are loosely placed in their carrying means, they are free to respond promptly to the forces acting, and it is an important feature that the tumblers are divided into groups of one or more, which are separated by walls on the carriage, as otherwise looseness and freedom of operation of the tumblers could not be obtained without danger of their falling over and piling upon each other.

The depressions 20 in the tops of the tumblers prevent restriction of movement by coming in contact with the edge of the cap 22, and the edge of this cap may be beveled, as shown, for the same purpose.

It will be observed that the commutator short-circuiting means here shown is inclosed in a practically tight chamber within the commutator structure so that it is prevented from damage by coming in contact with foreign bodies, and it is also protected from oil, dust, dirt, etc. It will also be observed that the short-circuiting means is automatic in its operation, being operated by centrifugal force, which increases as the speed of rotation increases. Obviously, that speed of rotation at which the tumblers will move outwardly and connect the commutator segments will depend upon the tension of the spring 15. Provision is made for adjusting the tension of this spring and so adjusting the operation of the short-circuiting means from the exterior of the chamber so that it is unnecessary to open this chamber to effect the desired adjustment. The adjustment is effected as follows: It has been before set forth that the annular plate 6 may be turned about the shaft in any suitable manner and may be locked in position by means of the locking collar 9. As has also been before noted, the collar 12 turns with the plate 6. According, therefore, to the direction in which the plate 6 is turned, the collar 12 will be advanced toward or retracted from the spring 15 along the shaft by reason of its screw-threaded engagement therewith, the engagement between the plate 6 and collar 12 being such as to permit longitudinal movement while preventing relative motion of rotation.

While the invention has been illustrated in what is considered its best application, it may be embodied in other structures without departing from its spirit. The invention, therefore, is not limited to the structure shown in the drawings.

What I claim is:

1. The combination with a rotatable shaft of a commutator structure thereon comprising segments and clamps displaced longitudinally of said shaft and clamping said segments together, means adapted to alternately connect and disconnect segments of said commutator and comprising a plurality of centrifugally operated tumblers each pivoted at one end and having a portion adapted to contact with a commutator segment, the pivot and contact portion being longitudinally displaced, said means being located between said segments and said shaft, the longitudinal limits of said means being within the outer longitudinal edges of said clamps, said structure having an inclined face located between said clamps and adapted to be engaged by said means.

2. The combination with a commutator structure of adjustable means adapted to alternately connect and disconnect segments of the commutator, said means being located in a closed chamber within said structure, adjusting means for said connecting and disconnecting means and means located in the walls of said chamber and accessible from the exterior of said chamber when it is closed for operating said adjusting means.

3. The combination with the segments of a commutator of clamping and supporting means therefor, said segments being insulated from each other and from the clamping and supporting means, a rotatable shaft upon which the commutator structure is mounted, adjustable means for alternately connecting and disconnecting segments of the commutator, said last mentioned means being mounted between the said segments and said shaft, means for adjusting the said connecting and disconnecting means, and a rotatable plate closing one end of the chamber in which the said connecting and disconnecting means is mounted and engaging with the said adjusting means to adjust the same as said plate is rotated.

4. The combination with the segments of a commutator of clamping and supporting means therefor, said segments being insulated from each other and from the clamping and supporting means, a rotatable shaft upon which the commutator structure is mounted, adjustable centrifugally operated means for alternately connecting and disconnecting segments of the commutator, said last mentioned means being mounted between the said segments and said shaft, means for adjusting the said centrifugally operated means, and a rotatable plate closing one end of the chamber in which the said centrifugally operated means is mounted and engaging with the said adjusting means to adjust the same as said plate is rotated.

5. The combination with a rotatable shaft of a commutator structure thereon comprising segments and clamps displaced longitudinally of said shaft and clamping said segments together, means adapted to alternately connect and disconnect segments of said commutator and comprising a plurality of tumblers each pivoted at one end and having a portion adapted to contact with a commutator segment, the pivot and contact portions being longitudinally displaced, said structure having an inclined face located between said clamps and adapted to be engaged by said means.

In testimony whereof I affix my signature, in presence of two witnesses.

LOUIS HENRY THULLEN.

Witnesses:
G. H. LIEBEL,
CLARENCE PRICE.